W. TAYLOR.
NUT LOCK.
APPLICATION FILED MAR. 26, 1919.

1,313,759.

Patented Aug. 19, 1919.

Inventor
William Taylor
By N. A. Gourick
Attorney

UNITED STATES PATENT OFFICE.

WILLIAM TAYLOR, OF LOWELL, INDIANA.

NUT-LOCK.

1,313,759.　　　　　　Specification of Letters Patent.　　Patented Aug. 19, 1919.

Application filed March 26, 1919.  Serial No. 285,140.

*To all whom it may concern:*

Be it known that I, WILLIAM TAYLOR, a citizen of the United States, residing at Lowell, in the county of Lake and State of Indiana, have invented certain new and useful Improvements in Nut-Locks, of which the following is a specification.

This invention relates to nut-locks and has for its object the provision of a nut lock in the nature of a spring wire member secured at one end upon the face of a nut, coiled about the bolt and having its terminal reflexly bent to form a tongue having a beveled end engaging the threads of the bolt upon which the nut is threaded, whereby upon attempted unthreading of the bolt the tongue will bite into the threads and contract the convolution of the wire about the bolt so as to form a grip and prevent further rotation and separation of the bolt and nut.

An important object is the provision of a nut lock of this character which will be very simple and inexpensive in manufacture, highly efficient in action, durable in service, and a general improvement in the art.

With the above and other objects and advantages in view, the invention consists in the details of construction to be hereinafter more fully described and claimed, and illustrated in the accompanying drawing, in which:

Figure 1:
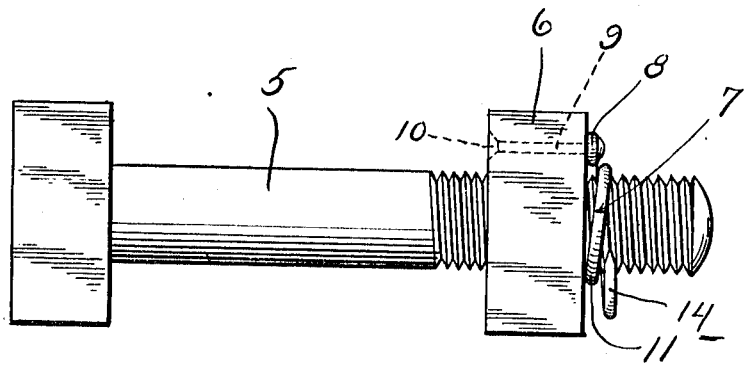
Figure 1 is a side elevation of a bolt and nut equipped with my device.
Figure 2:
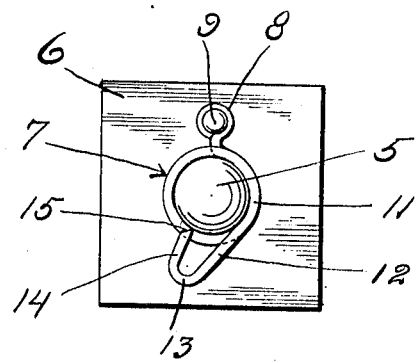
Fig. 2 is an end elevation looking at the outer face of the nut.

Referring more particularly to the drawing, the numeral 5 designates a bolt and 6 designates a nut threaded thereon. In carrying out my invention I provide a lock member in the nature of a single length of wire 7 which is formed at one end with a loop 8 which is rigidly secured upon the nut by a rivet 9 which has its head 10 countersunk within the engaging face of the nut. The wire 7 is coiled about the bolt 5 about one and one-half convolutions as shown at 11 and the free end extends off tangentially of the bolt as shown at 12 and is bent upon itself as shown at 13 at an angle of approximately 60° to provide a tongue 14 extending substantially radially toward the bolt, and this tongue has its extreme end beveled as shown at 15 to provide a point.

While I have shown and described the lock member as a length of wire secured to the nut by a rivet and wound around the bolt about one and one-half convolutions, the lock member may be formed of any suitable material, such as spring steel, and it may be secured to the nut by any suitable means.

A nut provided with my locking device is applied to a bolt in exactly the same manner as any other nut. When the nut is applied and screwed into position the beveled point 15 of the spring tongue 14 will engage between successive threads of the bolt. When there is any tendency of the nut to unscrew by jarring or any other cause, attempted reverse movement of the nut will result in the point of the tongue biting into the bolt between the threads thereon and this will result in causing contraction of the convolution 11 about the bolt 5 so that this convolution will firmly grip the bolt and thus lock the bolt and nut together against relative rotation. The greater the attempt to unscrew the nut the greater will be the gripping action of the lock on the bolt.

From the foregoing description and a study of the drawing it will be apparent that I have thus provided an extremely simple and very inexpensive nut-lock which will be positive and efficient in use, automatic in operation, and reliable in service.

I claim:

1. In combination with a bolt and a nut threaded thereon, a lock member formed as a length of flexible material secured at one end upon the nut and coiled about said bolt to provide a convolution completely encircling the bolt and normally spaced slightly therefrom, the free end portion of said lock member extending away from the bolt and being bent toward itself to provide a tongue extending toward the bolt, and the extremity of said tongue being formed with a point engaging between successive threads on the bolt.

2. In combination with a bolt and a nut threaded thereon, a lock member formed as a length of flexible material rigidly secured at one end upon the outer face of the nut and coiled about said bolt whereby to provide a convolution completely encircling the same in normally slightly spaced relation thereto, the free end of said lock member extending tangentially away from the bolt and being bent toward itself to provide a tongue extending substantially radially toward the bolt, and the extremity of said tongue being provided with a point engaging between successive threads on the bolt.

In testimony whereof I hereto affix my signature.

WILLIAM TAYLOR.